United States Patent [19]

Malm et al.

[11] E Re. 29,123

[45] Reissued Jan. 25, 1977

[54] VIBRATION ISOLATED UNITARY CAB AND CONTROL CONSOLE CONSTRUCTION FOR A TRACTOR

[75] Inventors: Donald Irwin Malm, Davenport; Craig Eugene Christie, Cedar Falls; Claire Eugene Rojohn, Denver, all of Iowa

[73] Assignee: Deere & Company, Moline, Ill.

[22] Filed: Sept. 24, 1973

[21] Appl. No.: 400,397

Related U.S. Patent Documents

Reissue of:

[64] Patent No.: 3,656,799
Issued: Apr. 18, 1972
Appl. No.: 28,328
Filed: Apr. 14, 1970

[52] U.S. Cl. ..... 296/35 R; 180/89.12

[51] Int. Cl.[2] ..... B62D 27/04

[58] Field of Search ..... 296/28 C, 35 R, 102; 180/89 R, 90

[56] References Cited

UNITED STATES PATENTS

| | | | |
|---|---|---|---|
| 3,420,568 | 1/1969 | Henriksson et al. | 296/35 R |
| 3,438,672 | 4/1969 | Gipp | 296/35 R |

FOREIGN PATENTS OR APPLICATIONS

| | | | |
|---|---|---|---|
| 1,032,672 | 6/1966 | United Kingdom | 296/35 R |

*Primary Examiner*—L. J. Paperner

[57] ABSTRACT

A tractor is provided with a unitary cab and control console construction which is secured to the tractor chassis by resilient mount assemblies which provide vibration isolation. The cab is disconnectible from the control console and during assemblage of the tractor, the control console may be mounted as a unit on the tractor chassis to provide controls for testing the working of and/or for moving the tractor before completing assembly of the tractor by adding the cab.

22 Claims, 8 Drawing Figures

*INVENTORS*
DONALD I. MALM
CRAIG E. CHRISTIE
CLAIRE E. ROJOHN

FIG. 2
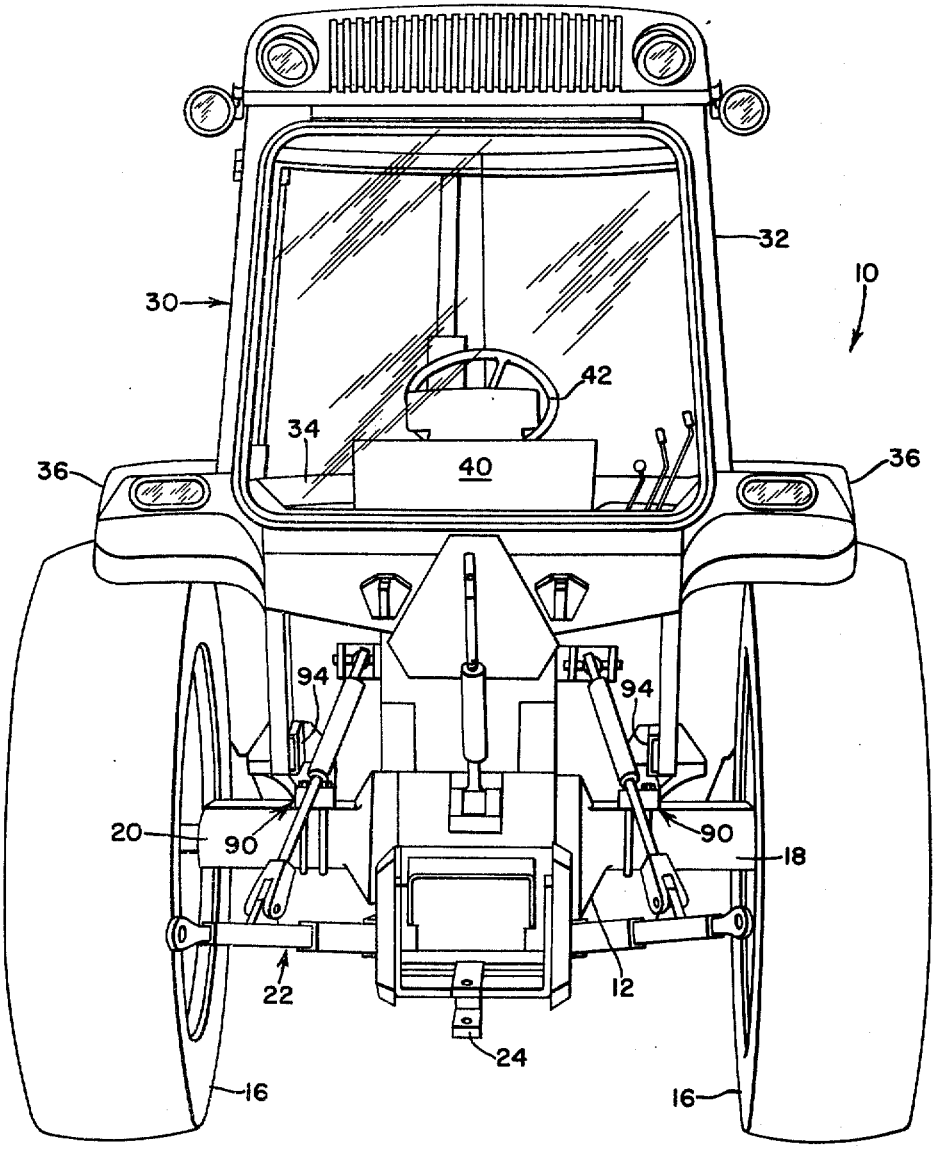
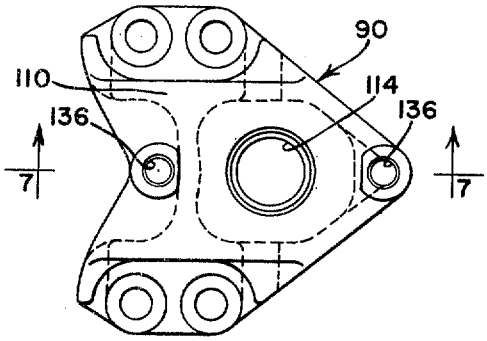
FIG. 6
*INVENTORS*
DONALD I. MALM
CRAIG E. CHRISTIE
CLAIRE E. ROJOHN

*INVENTORS*
DONALD I. MALM
CRAIG E. CHRISTIE
CLAIRE E. ROJOHN

*INVENTORS*
DONALD I. MALM
CRAIG E. CHRISTIE
CLAIRE E. ROJOHN

VIBRATION ISOLATED UNITARY CAB AND CONTROL CONSOLE CONSTRUCTION FOR A TRACTOR

Matter enclosed in heavy brackets [ ] appears in the original patent but forms no part of this reissue specification; matter printed in italics indicates the additions made by reissue.

BACKGROUND OF THE INVENTION

The present invention relates to a tractor cab and control console which are vibration isolated from the tractor chassis and more particularly the invention relates to a unitary cab and control console or control platform which are secured to the tractor chassis by common resilient mount assemblies.

The trend in modern farm tractors has been to increase their horsepower so as to increase their speed and capacity to do work. In order that a tractor operator will use a tractor to its capacity, it has been found necessary to provide an environment on the tractor which is free from noise, vibration, and objectionable atmospheric conditions. These environmental conditions have been provided, in part, in the past by designs including suspended seats, enclosed cabs, and resilient mount assemblies or connections for absorbing shocks transferred from the tractor chassis to the cab and controls. These designs, however, have lacked overall simplicity and judicious use of the resilient mount assemblies. Further, prior art designs of vibration isolated cabs and controls have had the controls integrated with the cab in a way which required the cab and controls to be mounted and dismounted on the chassis as a unit, making it necessary to provide special controls for operating the tractor when the cab and controls were removed, such as during processing in the factory, loading for shipping and/or for servicing.

SUMMARY OF THE INVENTION

According to the present invention, there is provided a tractor cab and control console which are vibration isolated from the tractor chassis.

An object of the invention is to provide a cab and control console unit which is secured by common resilient mount assemblies to the tractor chassis.

Another object is to provide a cab which is detachable from the control console and tractor chassis without disturbing the control console.

These and other objects will become apparent from the ensuing description and appended drawings.

BRIEF DESCRIPTION OF THE DRAWING

FIG. 2 is a perspective rear view of the tractor shown in FIG. 1.

FIG. 6 is a top view of the rear supporting bracket shown in FIG. 5.

DESCRIPTION OF THE PREFERRED EMBODIMENT

Figure 1:
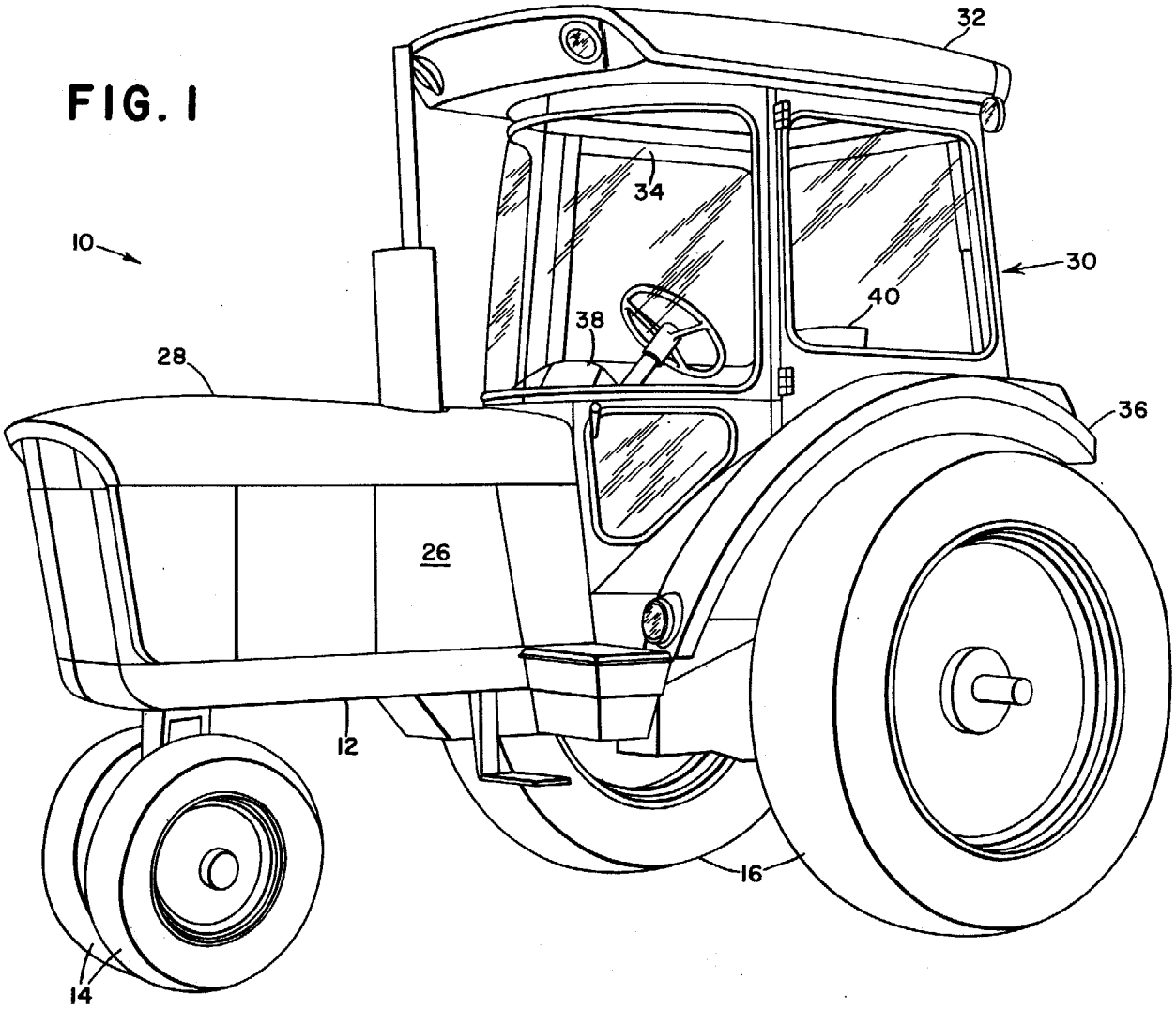
FIG. 1 is a perspective left side view of a tractor in which the present invention is embodied.

Referring now to FIGS. 1 and 2, there is shown an agricultural tractor indicated in its entirety by the reference numeral 10. The tractor 10 includes a chassis or main frame 12 supported at its forward end by a pair of front wheels 14 and supported at its rearward end by a pair of rear drive wheels 16 which are mounted on axles located in oppositely extending right and left axle housings 18 and 20. Located at the rear end of the tractor cab is a conventional three-point hitch 22 and a drawbar 24 for selective connection to implements.

The engine of the tractor 10 is partially shown, as at 26, and is covered by hood 28 which extends rearwardly from the front of the tractor and terminates adjacent the forward portion of an operator station 30.

The operator station 30 includes a removable cab 32 including an enclosed portion 34, to the opposite lower outer sides of which is attached a pair of fenders 36 which extend about the top and forward portions of the rear drive wheels 16. The enclosed portion 34 houses a control console or control island 38 which is located forwardly of a seat 40 mounted on the floor of the enclosed portion 34. As can best be seen in FIG. 3, the control console 38 carries, among other tractor controls (not shown), a steering assembly 42, a throttle lever 44, and a transmission speed and range shift lever 46. The control console 38 includes a pair of connecting brackets 48, only one being shown, which projects downwardly at opposite sides of the chassis 12. The connecting brackets 48 include right angular portions 50 having outer rearwardly extending legs 52 and horizontal plates 54 are integral with the bottoms of the portions 50 and extend laterally therebeyond.

Beneath the connecting brackets 48 are a pair of generally triangular supporting brackets 55, only one being shown, including inner vertical plates 56 secured to the chassis 12 by bolts 58. The supporting brackets 55 have horizontal legs 60 spaced vertically below the horizontal plates 54 of the connecting brackets 48. Joining the connecting brackets 48 and the supporting brackets 55 and providing vibration isolation therebetween are a pair of resilient mount assemblies 62.

The pair of resilient mount assemblies 62 respectively include opposed upper and lower resilient bushings 64 and 66, respectively having tubular metal inserts 68 and 70 bonded centrally therein. The upper bushings 64 have heads 72 overlying and skirts 74 received in dished water-like sockets 76 supported on the legs 60 and the lower portions 66 have heads 78 underlying and skirts 80 received in apertures 82 in the legs 60. Received in the metal inserts thereof and holding the upper and lower bushings 64 and 66 in place on opposite sides of the horizontal legs 60 of the supporting brackets 55 are bolts 84 which extend downwardly through apertures in the horizontal plates 54 of the connecting brackets 48, which bolts carry washers 86 that are held in supporting relationship to the lower bushings 66 by nuts 88.

A pair of supporting brackets 90 are secured to the axle housings 18 and 20 by U-bolts 92 and are respectively positioned in fore-and-aft alignment with the connecting and supporting brackets 48 and 55.

The cab 32 is supported on the tractor chassis 12 solely by the forward and rearward pairs of supporting brackets 55 and 90, respectively, and to this end has a frame including a pair of laterally spaced fore-and-aft extending channel-like beams 94 underlying the enclosed portion 34 and extending between the connecting brackets 48 and the rearward supporting brackets 90 at the opposite sides of chassis 12. The forward ends of the beams 94 are supported on the horizontal plates 54 of the connecting brackets 48 and are secured to the connecting brackets 48 by bolts 96. Joining the rear portions of the beams 94 to the rear support brackets 90 are resilient mount assemblies 98 which are similar in construction to the mount assemblies 62. Specifically, the mount assemblies 98 include opposed upper and lower resilient bushings 100 and 102, respectively having tubular metal inserts 104 and 106 bonded centrally therein. The upper bushings 100 have heads 108 overlying horizontal plate-like portions 110 of the brackets 90 and have skirts 112 received in socket-like apertures 114 in the portions 110. The lower bushings 102 have heads 116 underlying the portions 110 and have skirts 118 received in the aperture 114. Received in the metal inserts thereof and holding the upper and lower bushings 100 and 102 in place on opposite sides of the portions 110 of the brackets 90 are bolts 120 which extend downwardly through apertures in horizontally disposed flange portions 122 of the beams 94, which bolts carry washers 124 that are held in supporting relationship to the lower bushings 102 by nuts 126.

Integral with the opposite sides of each of the beams 94 are U-shaped ears 128 having angled sides 130 joined by webs 132 which overlie the plate-like portions 110 of the brackets 90. The webs 132 are apertured as at 134, and the apertures 134 are positioned above threaded holes 136 in the portions 110 of the brackets 90. Metal spacers 138 are received in the apertures 134 and have lengths greater than the thicknesses of the webs 132. Washers 140 and 142 are at the tops and bottoms of the spacers 138 and are held in place by screws 144 which are threaded into the holes 136. The washers 140 and 142 are positioned so as to engage the webs 132 of the ears 128 and thus limit the amount of vertical movement permitted by the resilient mount assemblies 98.

Figure 3:
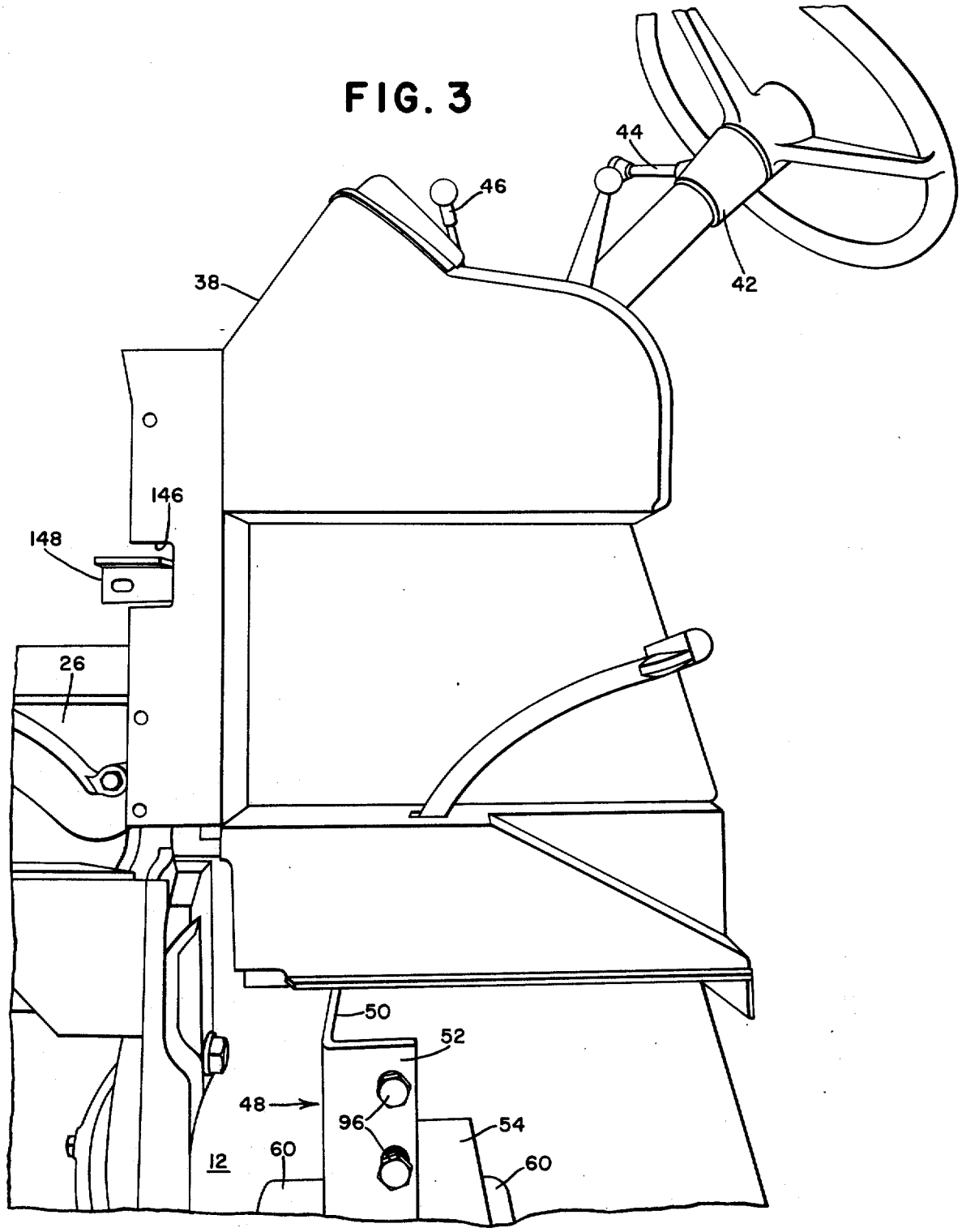
FIg. 3 is a perspective fragmentary left side view of the control console and its connection to the tractor chassis.
Figure 5:
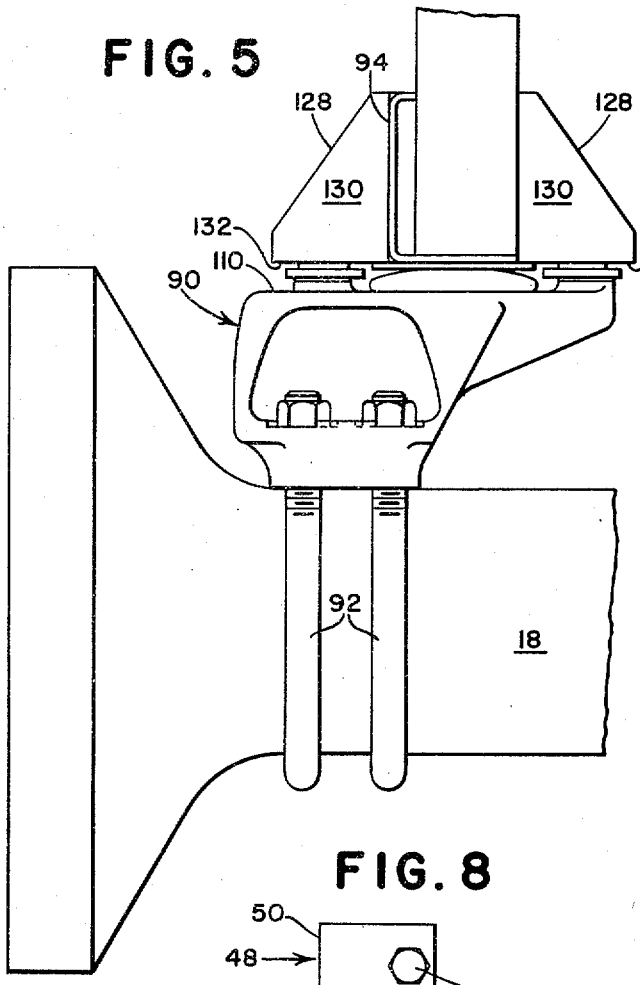
FIG. 5 is a rear view of the right rear supporting bracket showing the connection with the cab frame.
Figure 7:
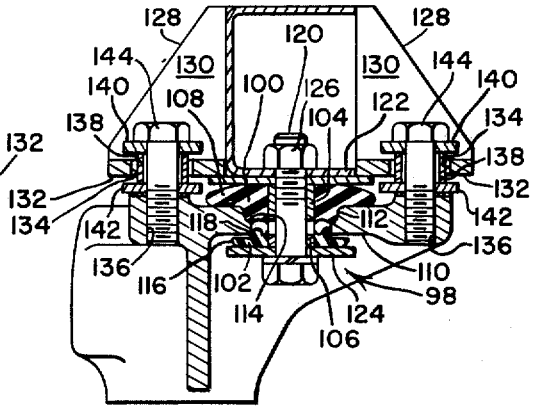
FIG. 7 is a sectional view taken along line 7—7 of FIG. 6, and further showing the connection of the bracket with the cab frame.
Figure 4:
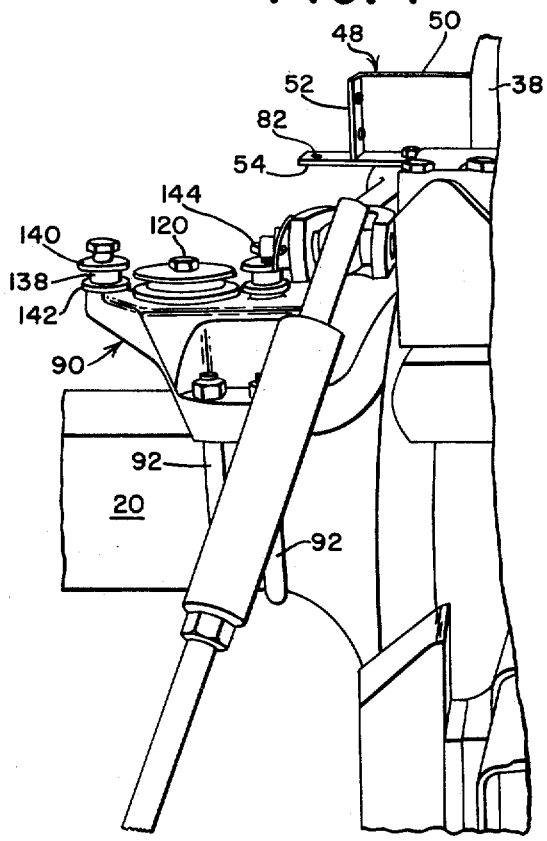
FIG. 4 is a perspective fragmentary rear view of the left side of the tractor showing the control console connecting bracket and the rear supporting bracket.
Figure 8:
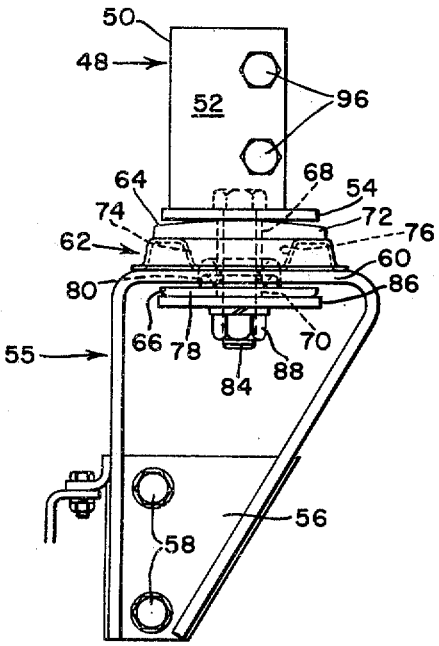
FIG. 8 is an enlarged side view of the front supporting bracket shown in FIG. 3.

Referring to FIG. 3, there is shown a notch 146 in the control console 38 which notch is dimensioned to permit vertical movements of the control console relative to a support 148 for the hood 28. Also, it is to be noted that the tractor controls carried by the control console 38 each have linkages (not shown) permitting limited vertical movement of the control console 38 relative to the chassis 12.

Thus, from the foregoing description it is apparent that vibration isolation is provided for the cab 32 and control console 38 as a unit and such vibration isolation is provided solely by the forward and rearward pairs of resilient mount assemblies 62 and 98.

Further, the sole connection between the cab 32 and the control console 38 is through the connecting brackets 48 to and from which the cab can be easily connected and disconnected. This permits the control console 38 to be mounted on the tractor without the cab so as to provide control for the tractor during assembly of the tractor and for testing the working parts thereof and/or for moving the tractor from place to place.

We claim:

1. In a tractor having a rigid main frame including a fore-and-aft extending portion supporting an engine and a hood overlying the engine, and including a pair of rearward transversely extending axle housings projecting outwardly from opposite sides of the main frame, the improvement comprising: a cab disposed generally above a rearward portion of the main frame; a seat mounted within the cab; a generally upright control console disposed forwardly of the seat and rearwardly of the engine and hood and carrying manually actuatable control elements, the cab and control console being connected to form a closed operator's station; a first pair of mounting brackets respectively mounted on opposite sides of the main frame rearwardly of the engine; a first pair of resilient mounting means connecting the control console to the first pair of mounting brackets; a second pair of mounting brackets respectively attached to the opposite axle housing; and a second pair of resilient mounting means connecting the cab to the second pair of mounting brackets, the first and second pairs of mounting means forming a resilient mount for the entire operator's station to isolate the operator' s station from the main frame.

2. In a tractor including a chassis, the improvement comprising: a first pair of generally fore-and-aft aligned support brackets secured to said chassis at respective locations to one side of the fore-and-aft centerline of said chassis and a second pair of generally fore-and-aft aligned support brackets secured to said chassis at respective locations on the opposite side of said centerline from said first pair of brackets; a cab including a pair of laterally spaced fore-and-aft extending frame members; a control console detachably secured to the forward ends of said fore-and-aft extending frame members to form a unitary assembly; and a resilient connection means for securing said assembly to said support brackets for isolating said assembly from chassis vibration, said control console being secured by said connection means to the foremost of said support brackets and said frame members being secured adjacent their rear ends by said connection means to the rearmost of said support brackets.

3. The invention defined in claim 2 wherein said control console includes a pair of connecting brackets extending downwardly at opposite sides of said chassis above said foremost support brackets and including horizontal plate members at the bottom thereof; and said frame members being supported on said horizontal plate members and being detachably secured to said connecting members.

4. In a tractor having a chassis including a pair of rearward laterally extending axle housings, the improvement comprising: a rearward pair of support brackets respectively secured to the rear axle housings; a forward pair of support brackets secured to the chassis on opposite sides of the fore-and-aft centerline of the chassis; a cab including a pair of laterally spaced fore-and-aft extending frame members; a control console detachably secured to said frame members to form a unitary assembly; and resilient connection means securing said assembly to said support brackets for isolating said assembly from chassis vibration, the control console being secured by said connection means to the foremost of said brackets and the cab frame members being secured by said connection means to the rearmost of said brackets.

5. The invention defined in claim 4 wherein said control console includes a pair of connecting brackets extending downwardly at opposite sides of said chassis above said foremost support brackets and including horizontal plate members at the bottoms thereof; and said frame members being supported on said horizontal plate members and being detachably secured to said connecting brackets.

6. In a tractor having a main frame directly and non-resiliently supported on a plurality of ground-engaging wheels, the improvement comprising: a tractor cab including a floor; a seat mounted on the floor within the cab, and a control console connected to the cab and disposed forwardly of the seat, the cab and the control console forming a utilized, enclosed operator station; a pair of forward, transversely spaced resilient mounting means connecting the control console to the main frame; and a pair of rearward transversely spaced resilient mounting means connecting the cab to the main frame, the entire operator's station being suspended from the main frame by said forward and rearward pairs of resilient mounting means to isolate the operator's station from vibrations in the main frame.

7. The invention defined in claim 6 wherein the control console is removably connected to the cab and independently mountable on the main frame via the forward pair of resilient mounting means.

8. In a tractor having a rigid main frame including a fore-and-aft extending portion and a pair of axle housings extending transversely in opposite directions from a rearward portion of the fore-and-aft extending portion and journalling rear axles directly connected to ground-engaging rear wheels and a fore-and-aft extending engine mounted on the fore-and-aft extending portion of the main frame and covered by a fore-and-aft extending hood, the improvement comprising: an operator's station including a cab disposed generally above the rear portion of the main frame, a seat mounted within the cab, and a generally upright control console disposed forwardly of the seat and rearwardly of the engine and hood and carrying tractor control actuating means; a first resilient mounting means connecting the control console to the main frame; and a second resilient means connecting the cab to the main frame.

9. The invention defined in claim 8 wherein the control console is removably secured to the cab, at least two of the mounting means connecting the control console to the fore-and-aft portion of the main frame and at least two other mounting means connecting the cab to the opposite axle housings.

10. The invention defined in claim 8 wherein each mounting means includes a bracket attached to the main frame and having a horizontal plate-like portion, a member attached to the operator's station and having a horizontal lower surface, and a resilient element interposed between the lower surface of said member and the horizontal portion of the bracket.

11. In a tractor including a chassis, a cab, and a control console, the improvement comprising: first mounting means including first resilient means directly securing said control console to said chassis; and second mounting means including second resilient means directly securing said cab to said chassis thereby isolating said control console and cab from chassis vibration.

12. The invention defined in claim 11 and further including fastening means detachably securing said cab to said control console to form a unit.

13. The invention defined in claim 12 wherein said cab includes a pair of laterally-spaced fore-and-aft extending frame members secured adjacent their rear ends by said second mounting means to the chassis, and detachably secured adjacent their forward ends to said control console.

14. The invention defined in claim 13 wherein said control console includes a pair of connecting brackets extending downwardly at opposite sides thereof above said first pair of support brackets and including horizontal plate members at the bottoms thereof; and said frame members being supported on said horizontal plate members and being detachably secured to said connecting brackets.

15. The invention defined in claim 11 wherein said first mounting means includes a first pair of support brackets secured to the chassis at laterally-spaced locations on opposite sides of the control console and connection means, including said first resilient means, securing each of said first support brackets to said control console.

16. The invention defined in claim 15 wherein said control console includes a pair of connecting brackets at the opposite sides thereof, the connecting brackets each including a horizontal plate member overlying a respective one of said first pair of support brackets and connection means including said first resilient means interconnecting said pair of support brackets and said horizontal plate member.

17. The invention defined in claim 15 wherein the chassis includes a pair of rear axle housings; said second mounting means including a second pair of support brackets respectively secured to said axle housings.

18. The invention defined in claim 17 and further including fastening means detachably securing said cab to said control console to form a unit.

19. The invention defined in claim 18 wherein said cab includes a pair of laterally-spaced fore-and-aft extending frame members having rear ends extending above said second pair of mounting brackets and secured thereto by connection means including said second resilient means, and detachably secured adjacent their forward ends to said control console.

*20. In a tractor having a main frame, an operator's cab disposed over a portion of the frame and having a bottom structure, an operator's seat carried in the cab, and a control console disposed over the main frame and at least partially in the cab ahead of the operator's seat, the improvement comprising: first connection means connecting the console to the bottom structure to combine the two as a unitized assembly during normal operation of the tractor; second connection means, including resilient elements, mounting the assembly on and in vibration-isolated relation to the main frame; said first connection means being separable to separate the cab and console while leaving the console on the main frame; and certain of the second connection means also being separable for at least partial separation of the cab away from the tractor and console.*

*21. The invention defined in claim 20, further characterized in that the portion of the bottom structure in the vicinity of the console has spaced apart side portions respectively at opposite sides of the console and providing a space through which the console projects upwardly, said space enabling the side portions to clear the console during separation of the cab away from the tractor.*

*22. The invention defined in claim 21 in which the first connection means include detachable connection between said side portions and the console.*

* * * * *